(No Model.)
S. KREISHER.
BRAKE FOR RAILWAY CARS.
No. 534,800. Patented Feb. 26, 1895.
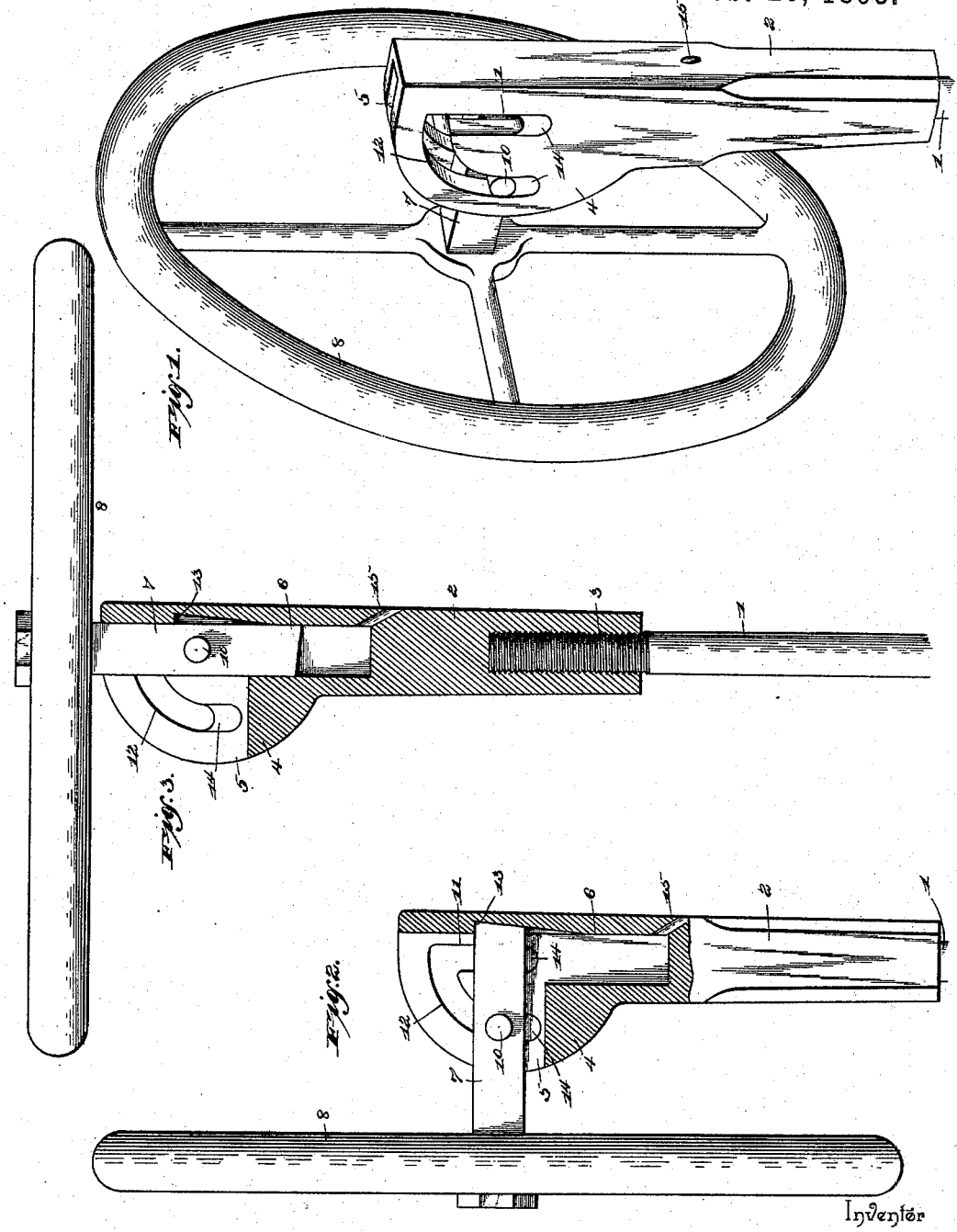
Witnesses
W. T. Doyle.
J. H. Riley
Inventor
Solomon Kreisher.
By his Attorneys,
C. A. Snow & Co.

UNITED STATES PATENT OFFICE.

SOLOMON KREISHER, OF SNYDERTOWN, ASSIGNOR OF TWO-THIRDS TO GEORGE O. MARTZ, OF SHAMOKIN, AND J. H. MARTZ, OF REED STATION, PENNSYLVANIA.

BRAKE FOR RAILWAY-CARS.

SPECIFICATION forming part of Letters Patent No. 534,800, dated February 26, 1895.

Application filed January 15, 1895. Serial No. 535,008. (No model.)

*To all whom it may concern:*

Be it known that I, SOLOMON KREISHER, a citizen of the United States, residing at Snydertown, in the county of Northumberland and State of Pennsylvania, have invented a new and useful Railway-Brake, of which the following is a specification.

The invention relates to improvements in car brakes.

The object of the present invention is to improve the manner of mounting the hand wheels of car brakes, and to enable such hand wheels to be readily folded back out of the way to clear the steps of a passenger coach, and to enable freight cars to be more completely loaded, and the like, and to be quickly brought into operative position when desired.

Another object of the invention is to provide such a folding hand wheel, which will in no wise decrease the efficiency of the brake, and which may be readily removed when desired, and in which there will be no noise and rattling.

The invention consists in the construction and novel combination and arrangement of parts hereinafter fully described, illustrated in the accompanying drawings, and pointed out in the claims hereto appended.

In the drawings, Figure 1 is a perspective view of a portion of a brake shaft provided with a hand wheel, constructed in accordance with this invention. Fig. 2 is a vertical sectional view of the same. Fig. 3 is a similar view, the wheel being in operative position.

Like numerals of reference indicate corresponding parts in all the figures of the drawings.

1 designates the ordinary vertically disposed railway brake-shaft, designed to be mounted at the ends of a car, in the usual manner, and to be connected with the brake levers; and the shaft is provided at its upper end with a socket or head 2, which may be formed integral with the shaft, but which is preferably constructed separately and secured to the upper end of the shaft by screw threads, or other equivalent means. The socket 2 is provided at its lower end with an opening 3, to receive the upper end of the shaft, and its upper end is enlarged and shaped into a substantially semi-circular head 4. The top or head of the socket is provided at its upper and outer edge with a quadrant-shaped opening 5, communicating with a rectangular or other polygonal-shaped socket opening 6, receiving a stem or shank 7, to which is detachably secured a hand wheel 8. The stem or shank 7 of the hand wheel fits snugly between the sides of the head in the curved or quadrant shaped opening, and, when in a vertical position, its lower end is stepped in the socket opening 6, and fits against the inner vertical side or wall of the head, and is rigidly connected with the brake shaft, whereby the hand wheel is connected with the same, and is maintained in a horizontal position for operating the brakes.

The stem or shank of the hand wheel is provided with projections or lugs 10, extending from opposite sides of it, and preferably formed by a pin arranged in a perforation of the shank and projecting therefrom; and these projections are arranged in vertical slots 11 of the head of the socket, when the stem or shank is in a vertical position, and prevent the hand wheel from accidentally swinging downward and outward. The vertical slots 11 permit the shank or stem of the hand wheel to be lifted vertically to disengage its lower end from the socket opening 6, and curved slots 12 extend downward and outward from the upper ends of the vertical slots, whereby when the stem or shank of the hand wheel is lifted out of engagement with the socket opening 6, it is adapted to be swung downward and outward into a horizontal position, the projections moving in the curved slots. This construction permits the hand wheel to be readily changed from a vertical to a horizontal position, and the change may be instantly effected. When the stem or shank is arranged in a horizontal position, its inner end engages a stop or shoulder 13, preferably formed by recessing the inner vertical wall or side of the socket. This stop or shoulder limits the upward movement of the inner or lower end of the shank or stem, and prevents the latter swinging downward past a horizontal position.

The hand wheel is detachably secured to the upper end of the shank or stem, by means of a nut in the ordinary manner, and it is adapted to be detached when desired, and by removing the pin from the shank or stem, the latter may be taken out of the socket.

In order to prevent any noise or rattling the movements of the hand wheel and its shank are cushioned by blocks 14 of rubber, or other elastic material, arranged at the bottoms of the vertical and curved slots, but any other form of cushion may be employed.

At the base of the socket opening is a drip or escape opening 15, to prevent accumulation of dust, dirt and other substances, and also to prevent the collection of water, and the accumulation of ice in the socket opening, whereby the stem or shank of the hand wheel will always fit snugly in the socket opening.

It will be seen that the hand wheel is exceedingly simple and inexpensive in construction, that it is adapted to be readily applied to the ordinary brake shafts in use on cars, that it possesses great strength and durability, and that it does not in any manner impair the strength or efficiency of car brakes. It will also be seen that the hand wheel may be readily folded out of the way, when desired, and may be quickly brought into operative position, by a train hand, by simply drawing the wheel upward toward him, and that when in operative position it is firmly interlocked with the brake shaft.

Changes in the form, proportion, and the minor details of construction may be resorted to without departing from the principle or sacrificing any of the advantages of this invention.

What I claim is—

1. A brake shaft provided with a socket, having a substantially quadrant-shaped opening at its top, combined with a hand wheel provided with a shank fitting in the socket and interlocked with the same and adapted to be lifted out of such engagement and arranged to swing downward in said opening, whereby it is transferred from a horizontal to a vertical position, and vice versa, substantially as described.

2. A brake shaft socket provided at its top with a substantially quadrant-shaped opening, and provided at opposite sides with vertical slots and having curved slots extending downward and outward from the upper terminals of the vertical slots, combined with a hand wheel having a stem fitting in the socket and provided with projections arranged in said slots, whereby the stem is capable of vertical movement to disengage its lower end from the socket, and is adapted to be swung down to a horizontal position for folding the hand wheel out of the way, substantially as described.

3. A brake shaft socket, provided at its top with a head, and having a quadrant-shaped opening and provided at the bottom thereof with a socket opening, and having on its interior a shoulder or stop, combined with a hand wheel provided with a stem arranged in the socket and having its lower end interlocked with the socket opening and capable of a limited vertical movement to disengage its lower end and arranged to swing downward into a horizontal position, and to engage the stop or shoulder, substantially as described.

4. A brake shaft socket, provided at its upper end with a head, having a quadrant-shaped opening, and provided at opposite sides with vertical and curved slots, and having on its interior a stop or shoulder, combined with a hand wheel having a stem arranged in the socket and provided with projections fitting in the slots thereof, and cushions located at the lower ends of the slots and adapted to receive the projections of the stem, substantially as described.

In testimony that I claim the foregoing as my own I have hereto affixed my signature in the presence of two witnesses.

SOLOMON KREISHER.

Witnesses:
JOHN H. SIGGERS,
E. G. SIGGERS.